United States Patent [19]

Fischer

[11] 4,023,029

[45] May 10, 1977

[54] DISTANCE INDICATING MIRROR DEVICE

[76] Inventor: Kenneth J. Fischer, 6595 San Juan Ave., Apt. 31, Jacksonville, Fla. 32210

[22] Filed: Oct. 28, 1975

[21] Appl. No.: 625,834

[52] U.S. Cl. .............................. 240/4.2; 350/293
[51] Int. Cl.² ..................... F21V 33/00; G02B 5/10
[58] Field of Search .......... 350/293, 288, 303, 304, 350/302, 307; 356/21, 20, 9, 3, 255; 240/4.2, 2 M; 33/264, 277, 241; 250/467; 116/57; 40/219, 130 B, 134

[56] References Cited

UNITED STATES PATENTS

| | | | |
|---|---|---|---|
| 1,311,253 | 7/1919 | Stern | 350/293 |
| 1,832,248 | 11/1931 | Schrader | 350/288 |
| 1,879,592 | 9/1932 | Thomas | 350/288 |
| 2,461,315 | 2/1949 | Devirgilis | 350/288 |
| 2,749,541 | 6/1956 | Whittlesey | 40/219 |
| 2,871,754 | 2/1959 | Marble | 350/307 |
| 2,881,655 | 4/1959 | Eisenschink | 356/21 |
| 3,521,234 | 7/1970 | Davin | 356/21 |
| 3,772,795 | 11/1973 | Calvet | 356/3 |

FOREIGN PATENTS OR APPLICATIONS 625,776  10/1961  Italy ..................................... 356/21

*Primary Examiner*—John K. Corbin
*Assistant Examiner*—Jon W. Henry
*Attorney, Agent, or Firm*—George H. Baldwin; Arthur G. Yeager

[57] ABSTRACT

A convex mirror has a frosted non-reflective elongated and horizontal line, approximately midway of the mirror and of a width less than the thickness of the mirror, and a light source is disposed adjacent the reflective surface with a colored filter positioned between the light source and the frosted line whereby a predetermined safe distance is indicated for changing lanes into a position in front of the immediately passed vehicle. In another mirror, safe turning distances are indicated by predetermined lines extending vertically of the convex mirror.

9 Claims, 6 Drawing Figures

DISTANCE INDICATING MIRROR DEVICE

BACKGROUND OF THE INVENTION

1. The invention relates to rear viewing indicating devices for automotive vehicles and more particularly to a mirror device for indicating safe distance conditions for the passing vehicle to pull into the lane of the just passed vehicle.

2. DESCRIPTION OF THE PRIOR ART

There have been many mirror devices suggested in the prior art, some of these devices being U.S. Pat. Nos. 2,257,510— Mote; 2,302,952 — Pfeifer; 2,320,904 — Bachkai; and 2,858,810 — Troendle. The prior art also discloses a speed and range indicating system for determining safe passing conditions with respect to oncoming vehicles in U.S. Pat. No. 2,738,753 — Eubank. However, none of the prior art discloses a rear view mirror device for indicating safe pull in conditions for the passing vehicle before such vehicle changes lanes into a position in front of the passed vehicle.

SUMMARY OF THE INVENTION

In accord with this invention a distance indicating mirror device for attachment to a passing vehicle is disclosed and includes a mirror for reflecting a image of a passed vehicle, and indicia means is located in the optical path of the mirror, such indicia means viewable outwardly of the mirror for indicating a predetermined safe distance between the vehicle passing and a just passed vehicle whereby the passing vehicle may safely change lanes or pull over in front of the just passed vehicle. Preferably the mirror is convex to present a sufficiently wide area of view rearwardly of the passing vehicle. The indicia means is formed by a line, disposed approximately midway of and generally horizontally of the mirror, above which substantially the entire imgage of the just passed vehicle will be reflected when the predetermined safe distance is achieved.

In other aspects the line includes a non-reflective surface portion of the mirror and such portion is not only preferably frosted but is colored as by tinting, coating, or providing a colored filter in front of or behind the line.

The device includes a housing for supporting the mirror, with a chamber therein defined in part by the non-reflective surface portion or line and the reflective mirror portion. Illuminating means is disposed within the chamber for emitting light through the colored filter whereby the line will pass colored light through the mirror which will be viewable at night by the driver of the passing vehicle even though the head lights of the just passed vehicle is being reflected by the mirror. Reflector means is disposed in said chamber and between the housing and illuminating means for directing and intensifying the light through the line. The illuminating means includes a bulb within the chamber and electrical wiring means extends through the housing universal mounting means and into the chamber and is electrically coupled to the bulb.

Preferably the illuminating means also includes a receptacle rigidly mounted with respect to the housing with the receptacle receiving the bulb and being electrically connected to the electrical wiring means.

In order that supurious reflections and refractions be minimized because of the frosted line being present, the reflective surface portion of a predetermined width is removed, as by sand blasting, from the remainder of the reflective surface portion of the mirror, such predetermined width being less than the thickness of the glass or other transparent or substantially transparent material from which the mirror is made.

In yet other aspects of this invention the indicia means may include generally vertical lines to denote proper turning clearances around a corner for the passing vehicle, this feature being of primary importance to tractor-trailer vehicles.

A general object of the invention is to provide a distance determining rear view mirror device for vehicle.

A particular object is the provision of indicia on a rear view mirror whereby safe pull in with respect to a just passed vehicle is determined.

A specific object is to provide a day and night distance determining rear view mirror device.

A further specific object is the provision of an illuminated rear view mirror device with such illumination further functioning to defrost the mirror.

Other objects include the provision of a novel rear view mirror device which is durable and efficient in use, simple and easy to manufacture, and inexpensive and readily installed and maintained on a vehicle.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENTS

Figure 1:
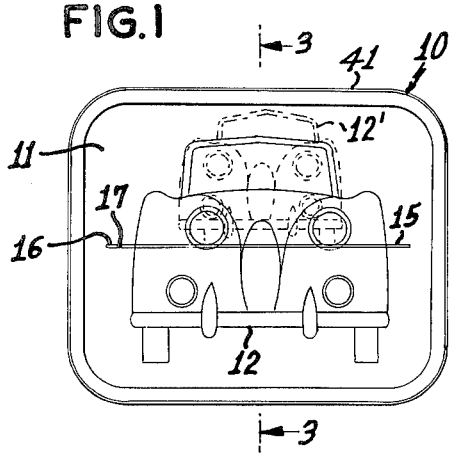
FIG. 1 is a front elevational view of the distance indicating device in accord with the invention.

Referring now more particularly to the drawing, FIG. 1 depicts the distance indicating mirror device, generally designated by numeral 10, such device including a mirror 11, preferably a slightly convex mirror, having a radius of at least about twenty inches and even a convex mirror radius of about fifty inches may be acceptable but would diminish the angle of view thereof, for presenting a broad view rearwardly of the vehicle to which it is attached, hereinafter referred to as a passing vehicle. The full line image 12 of an immediately passed vehicle is reflected by mirror 11 and when such vehicle becomes diminished, representing a predetermined distance or a safe pull-in distance for the passing vehicle with respect to the immediately passed vehicle, the broken line image 12 becomes reflected by the mirror 11. Such safe pull-in distance should be at least twenty feet and preferably thirty feet according to many safety experts.

In accord with this invention indicia means 15 are provided in the optical path between the mirror and the driver of the passing vehicle, such indicia means being viewable outwardly of mirror 11 and is seen to include a generally horizontal line elongated area in the form of a stripe or a line 16 above which the diminished image 12' will appear, as clearly shown in FIG. 1.

Figure 4:
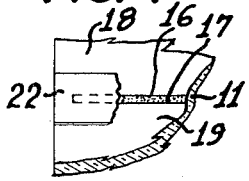
FIG. 4 is an enlarged view of a central portion of the mirror portion of the device.
Figure 3:
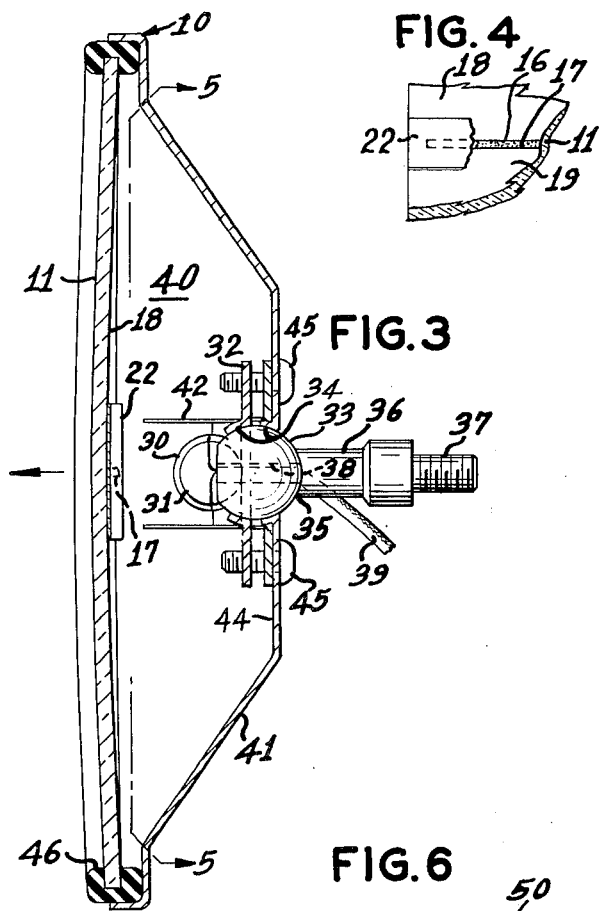
FIG. 3 is an enlarged cross-sectional view taken along line 3—3 of FIG. 1.

By reference to FIGS. 1, 3 and 4, the line 16, in accord with this invention, is defined by a non-reflective portion 17 which interrupts the reflective portion 18 of the normally covered rear surface 19 of the mirror 11. Preferably, the non-reflective portion 17 of the mirror 11 is obtained as by a suitable template or masking therearound with the normally reflective coating therealong being removed by sandblasting techniques whereby to provide such portion 17 with a pitted or frosted appearance, in a manner well known in the art. Means for changing the color of the non-reflective portion 17 is provided by a colored filter 22 suitable attached, as by an adhesive, to mirror rear surface 19 overlying non-reflective portion 17 whereby light may pass therethrough and the same may be distinguished from, for example, white light emanating from the headlights of an immediately passed vehicle onto mirror 11 and reflected therefrom into the eyes of the driver of the passing vehicle to which device 10 is attached.

It is to be understood that other techniques for removing the reflective coating from the rear surface 19 of the mirror 11, to provide the non-reflective portion 17, may be employed, as by chemical etching or mechanical grinding or scraping, without departing from the scope and intent of this invention. Furthermore, the filter 22 may be any suitable color such as green, blue or red (it is believed that any light which is emitted rearwardly by a road traveling vehicle, while moving forwardly, must be red) and could be provided by appropriate tinting of such non-reflective portion 17; mirror 11 may be made of glass, plastic or other suitable material which effectively reflects and possess the proper optical properties; the non-reflective portion 17 may be provided on either side of the mirror 11 with a suitable fluorescent or phosphoresent substance which emits light of a color different than the light reflected by the remainder of the mirror from the light emanating from the headlights of an immediately passed vehicle; and the colored light may be provided by colored light bulbs, ie., the filter is attached to the light bulb enclosure rather than the rear surface of the mirror.

Figure 2:
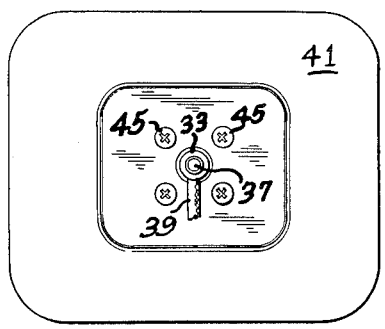
FIG. 2 is a rear elevational view thereof.
Figure 5:
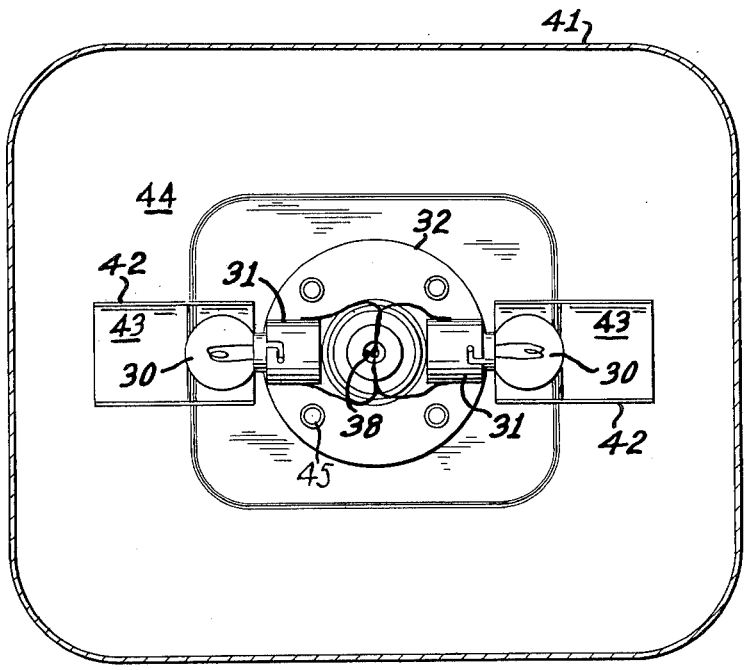
FIG. 5 is a cross-sectional view taken along line 5—5 of FIG. 3.

By reference to FIGS. 2, 3 and 5 other features of the disclosed invention are seen to include the provision of illuminating means in the form of a pair of light bulbs 30 removably attached to receptacles 31, receptacles 31 being affixed to plate 32 forming a part of the universal mounting or ball 33 and socket 34. The ball 33 is formed at one end 35 of a mounting arm 36 with the opposite end 37 being suitable threaded or the like for attachment to a vehicle. While the mirror device 10 is preferably affixed to and adjacent the right side of a vehicle, it is possible for such device to be mounted on the left side of a vehicle and/or to be mounted as the inside rear view mirror within the driver's compartment. Returning to the description of the ball and socket, a passageway 38 is provided through the arm end 35 and ball 33 for receiving electrical wiring means 39 therethrough, wiring means 39 being adapted for connection to an electrical energy source or battery of the vehicle to which device 10 is attached and extending into the chamber 40 formed by and between housing 41 and mirror 11 and electrically connecting receptacles 31 and bulbs 30 in parallel. Reflectors 42 are appropriately affixed, as by an adhesive, to the inner surface 43 of housing 41 with the height of the reflectors 42 terminating spacedly away from the reflective rear surface 18 of the mirror 11 to avoid damage thereto. Reflectors 42 are generally channeled shaped with the bottom 43 generally following the contour of the inner housing surface 44, reflectors 42 extending alone the non-reflective line portion 17 for directing the light emanating from the bulbs 30 therethrough and the heat from the bulbs 30 providing the attendant benefit of defrosting the mirror 11 when device 10 is disposed outwardly of the vehicle, as will be apparent to persons skilled in the art.

The plate 32 and the plurality of bolts 45 for adjusting the frictional force on the ball 33 are common, as well as the resilient mounting gasket 46 which force fits into and mounts mirror 11 to housing 41.

In accord with the invention the width of the line 16 is preferably less than the thickness of the mirror 11 whereby spurious reflections and refractions are minimized, as well as removing only the minimum amount of the reflective viewing surface of the mirror. When light is being passed through a mirror non-reflective wide line portion, a "bleeding" effect in and along the plane of the mirror tends to widen the lighted line as it is being viewed by the driver and tends to obscure the image of the immediately passed vehicle. The herein disclosed thin line minimizes this bleeding effect, and the frosted condition of the line 16 provides for a more even distribution of the light therethrough.

Figure 6:
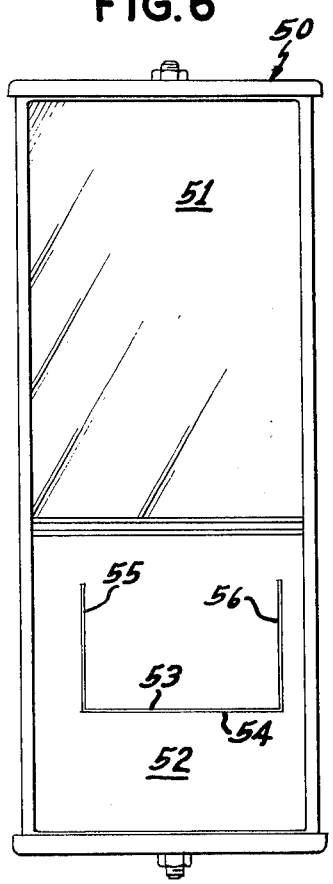
FIG. 6 is another front elevational view of another embodiment of the distance indicating device in accord with the invention.

In FIG. 6 another embodiment of the distance indicating device is generally depicted by numeral 50 and includes a planar mirror 51 and a convex mirror 52 carrying indicia means 53 substantially in accord with the previously disclosed embodiment of the invention shown in FIGS. 1–5. In addition to the horizontal line 54, indicia means 53 also includes generally vertical non-reflective line portions 55 and 56 which are positioned in predetermined locations to indicate to the driver, to which device 50 is attached, that proper turning clearances are obtained when the object is adjacent to, for example, line 56 and between lines 56 and 55. As will be apparent, device 50 is primarily intended as an outside mirror for a tractor vehicle of a tractor-trailer combination.

It is also understood that additional bulbs, similar to bulbs 30 and reflectors, etc., may be provided within device 50 for intensifying the illumination of lines 55 and 56. Also, it is apparent that colored filters, functioning as safety lights or reflectors may be provided in housings of the devices 10 or 51 to permit colored light to be emitted therethrough forwardly of the vehicle.

While the invention has been described with respect to certain specific embodiments, it will be appreciated that many modifications and changes may be made by those skilled in the are without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A distance indicating mirror device for attachment to a passing vehicle comprising a convex mirror for reflecting an image of a passed vehicle, a housing for supporting said mirror, said housing having a chamber therein partially defined by the reflective surface portion of said mirror, and indicia means on said mirror and viewable outwardly of said mirror for indicating a predetermined safe distance between a passing and a passed vehicle whereby a passing vehicle may relatively safely pull over in front of an immediately passed vehicle, said indicia means including a non-reflective surface portion of the otherwise reflective surface of said mirror located at a light transmitting predetermined horizontal position on said mirror when attached to a passing vehicle above which the image of a passed vehicle will be reflected when said predetermined safe distance is achieved, illuminating means disposed within said chamber for emitting light, and a colored filter between said non-reflective surface portion and said illuminating means for passing colored light through said non-reflective surface portion of said mirror.

2. In the device as defined in claim 1 wherein said non-reflective surface portion is frosted.

3. In the device as defined in claim 1 further comprising reflector means disposed between said housing and illuminating means for directing the light through said non-reflective surface portion.

4. In the device as defined in claim 1 further comprising a universal mounting means for said housing to adjustably position said mirror with respect to a driver of a passing vehicle, said illuminating means including a bulb within said chamber and electrical wiring means extending through said universal mounting means into said chamber and being electrically coupled to said bulb, said wiring means being adapted for connection to an electrical energy source of a passing vehicle.

5. In the device as defined in claim 4 wherein said illuminating means includes a receptacle rigidly mounted with respect to said housing, said receptacle receiving said bulb and being electrically connected to said electrical wiring means.

6. In the device as defined in claim 1 wherein said non-reflective surface portion is of a predetermined width interrupting the reflective surface of said mirror, said mirror having a thickness greater than said predetermined width to minimize spurious reflections and refractions.

7. In the device as defined in claim 6 wherein said non-reflective surface portion is frosted.

8. In the device as defined in claim 1 wherein said non-reflective surface portion is disposed approximately midway of said mirror.

9. In the device as defined in claim 1 wherein said indicia means further includes generally vertical and spaced light transmitting non-reflective portions to denote proper turning clearances around a corner for a passing vehicle to which said device is attached.

* * * * *

UNITED STATES PATENT AND TRADEMARK OFFICE
CERTIFICATE OF CORRECTION

PATENT NO. : 4,023,029
DATED : May 10, 1977
INVENTOR(S) : Kenneth J. Fischer

It is certified that error appears in the above-identified patent and that said Letters Patent are hereby corrected as shown below:

```
Column 1, line 37, "imgage" should read --image--
Column 2, line 65, after "12" insert --'--
Column 4, line 31, change "bleeding" to read --"bleeding"--
```

Signed and Sealed this

Eighth Day of November 1977

[SEAL]

Attest:

RUTH C. MASON
*Attesting Officer*

LUTRELLE F. PARKER
*Acting Commissioner of Patents and Trademarks*